(12) United States Patent
Yan et al.

(10) Patent No.: US 7,703,191 B2
(45) Date of Patent: Apr. 27, 2010

(54) CUTTING SHIELD MACHINE

(75) Inventors: Aijun Yan, Tu-Cheng (TW); Wei Wang, Tu-Cheng (TW); Yu Zhou, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 445 days.

(21) Appl. No.: 11/878,002

(22) Filed: Jul. 20, 2007

(65) Prior Publication Data

US 2009/0019682 A1    Jan. 22, 2009

(51) Int. Cl.
*B23P 19/00* (2006.01)

(52) U.S. Cl. ............... 29/564.4; 29/56.6; 29/417; 29/426.3; 29/33 F; 29/564.6; 83/234; 83/244

(58) Field of Classification Search ........... 29/745–749, 29/564.2–564.4, 56.6, 426.3–426.5, 434, 29/11; 82/104, 117, 129; 83/234, 244, 263; 226/122, 157, 187
See application file for complete search history.

(56) References Cited

U.S. PATENT DOCUMENTS

| 2,973,706 | A | * | 3/1961 | Kingsley | 226/157 |
| 4,524,657 | A | * | 6/1985 | Griffith | 83/69 |
| 4,730,379 | A | * | 3/1988 | Chen | 29/434 |
| 5,191,693 | A | * | 3/1993 | Umetsu | 29/429 |
| 5,756,953 | A | * | 5/1998 | Lehmann | 219/69.12 |
| 6,584,677 | B2 | * | 7/2003 | Garcia et al. | 29/605 |

* cited by examiner

*Primary Examiner*—Minh Trinh
(74) *Attorney, Agent, or Firm*—Rosenberg, Klein & Lee

(57) ABSTRACT

This present invention discloses a cutting shield machine used for separating iron shells of connectors from a metal strip. The cutting shield machine includes a worktable, a separation apparatus located in the worktable, a carrying apparatus located in the worktable delivering the metal strip into the separation apparatus, a receiving box located in the worktable for receiving the iron shells from the separation apparatus, a crossing apparatus and a driving apparatus located in the worktable. The separation apparatus has a prop stand located in the worktable, a rotating portion with a columned portion capable of rotation and a pole are fixed in the prop stand in sequence in the transmission direction of the metal strip. The metal strip passes from the top of the rotating portion and the bottom of the pole or from the bottom of the rotating portion and the bottom of the pole.

4 Claims, 7 Drawing Sheets

CUTTING SHIELD MACHINE

BACKGROUND OF THE INVENTION

1. Field of the Invention

This present invention relates to a cutting shield machine, and more specifically to a cutting shield machine cutting iron shells of connectors from a metal strip.

2. The Related Art

Conventionally, an iron shell of a connector is generally stamped from a metal strip by a mold. In order to plate, the iron shell is stamped and connected with the metal strip still, by this, the iron shell is plated conveniently in a plating apparatus. A breaking groove is arranged between the iron shell and the metal strip. To assemble an iron shell into a connector, a worker needs to bend the iron shell and separate the iron shell from the metal strip by the breaking groove. The productivity is increased by the breaking groove between the iron shell and the metal strip, but the iron shell is fetched from the metal strip by hand, therefore, the iron shell is easy to deform by hand.

SUMMARY OF THE INVENTION

An object of the invention is to provide a cutting shield machine cutting iron shells form a metal strip. The cutting shield machine includes a worktable, a separation apparatus fixed in the worktable, a carrying apparatus delivering the metal strip into the separation apparatus, a receiving box receiving the iron shells separating from the metal strip, a crossing apparatus rolling up the metal strip without the iron shell, and a driving apparatus driving the crossing apparatus to rotate. The separation apparatus has a prop stand installed on the worktable, a rotating portion with a columned portion capable of rotation and a pole are fixed in the prop stand in sequence in the transmission direction of the metal strip. The metal strip passes from the top of the rotating portion and the bottom of the pole or from the bottom of the rotating portion and the bottom of the pole.

Just as the above description, the cutting shield machine separates the iron shells from the metal strip by the top of the rotating portion and the bottom of the pole or the bottom of the rotating portion and the top of pole, which replaces the manpower method, improves the working efficiency greatly, reduces the bad rate of the products, and lighten worker's labor intensity, therefore the large-scale production is easily realized.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE PREFERRED EMBODIMENT

Figure 1:
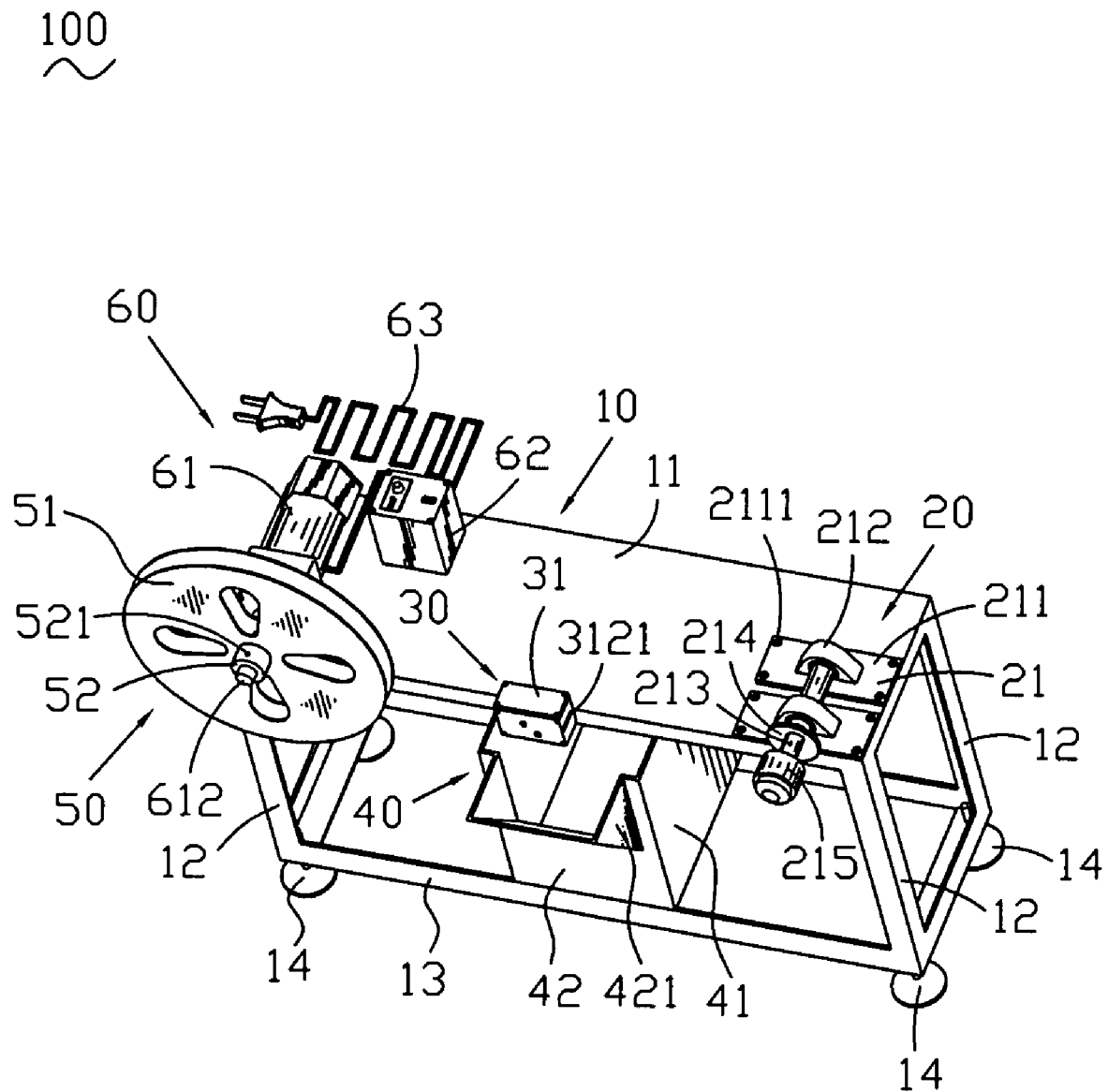
FIG. 1 is an assembled perspective view of a cutting shield machine according to the present invention.

First referring to FIG. 1, a cutting shield machine 100 according to the invention is shown. The cutting shield machine 100 comprises a rectangle worktable 10, a carrying apparatus 20, a separation apparatus 30, a receiving box 40, a crossing apparatus 50 and a driving apparatus 60 fixed in the worktable 10. The worktable 10 has a rectangle working board 11, four knightheads 12 extend downward from four corners of the working board 11. Four crossing bars 13 connect the bottom of the adjacent two knightheads 12 respectively. Four balance screws 14 are fixed in the ends of the crossing bars 13 respectively, for adjusting the height of the four corners of the worktable 10 to make the worktable 10 in a level state.

Figure 2:
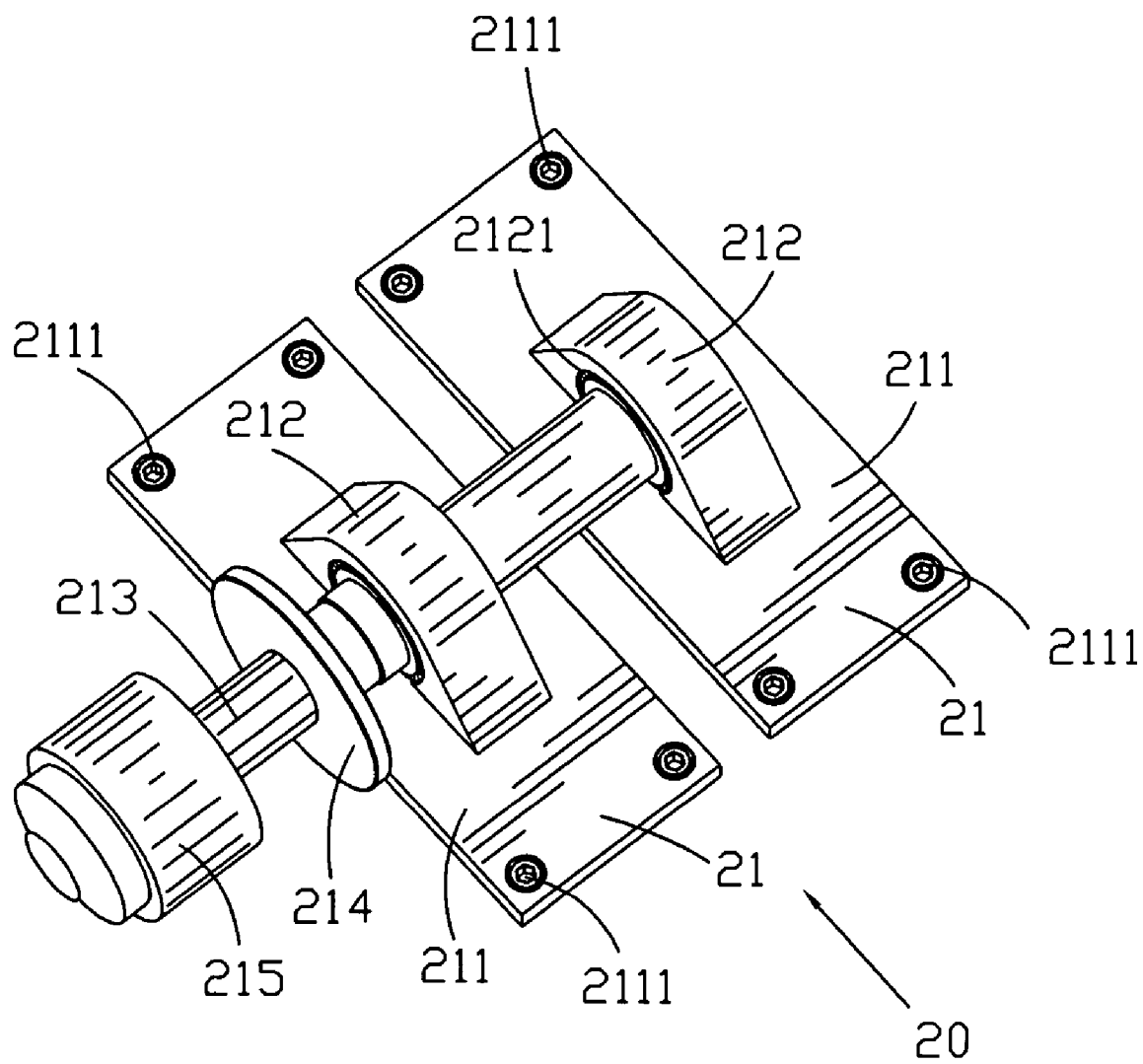
FIG. 2 is an assembled perspective view of a carrying apparatus of the cutting shield machine.

Please referring to FIGS. 1 and 2, the carrying apparatus 20 fixed on one end of the worktable 10 includes two parallel accepting bases 21. The accepting base 21 has a rectangle ground board 211. Four fasten holes 2111 are opened in four corners of the ground board 211, four screws pass through the fasten holes 2111 to fasten the ground board 211 on the working board 11. A firming portion 212 projects upward from the middle of the ground board 211, an axle hole 2121 is formed widthways in the firming portion 212. The two axle holes 2121 of the two firming portion 212 face to each other. Two ends of a shaft 213 are accepted in the axle holes 2121 of the firming portions 212 respectively. One of the two ends of the shaft 213 stretches out of the working board 11, an inner firming block 214 and an outer firming block 215 are arranged separately in this end of the shaft 213. In this embodiment, the inner firming block 214 shows a round board shape, the outer firming block 215 shows a pole shape.

Figure 3:
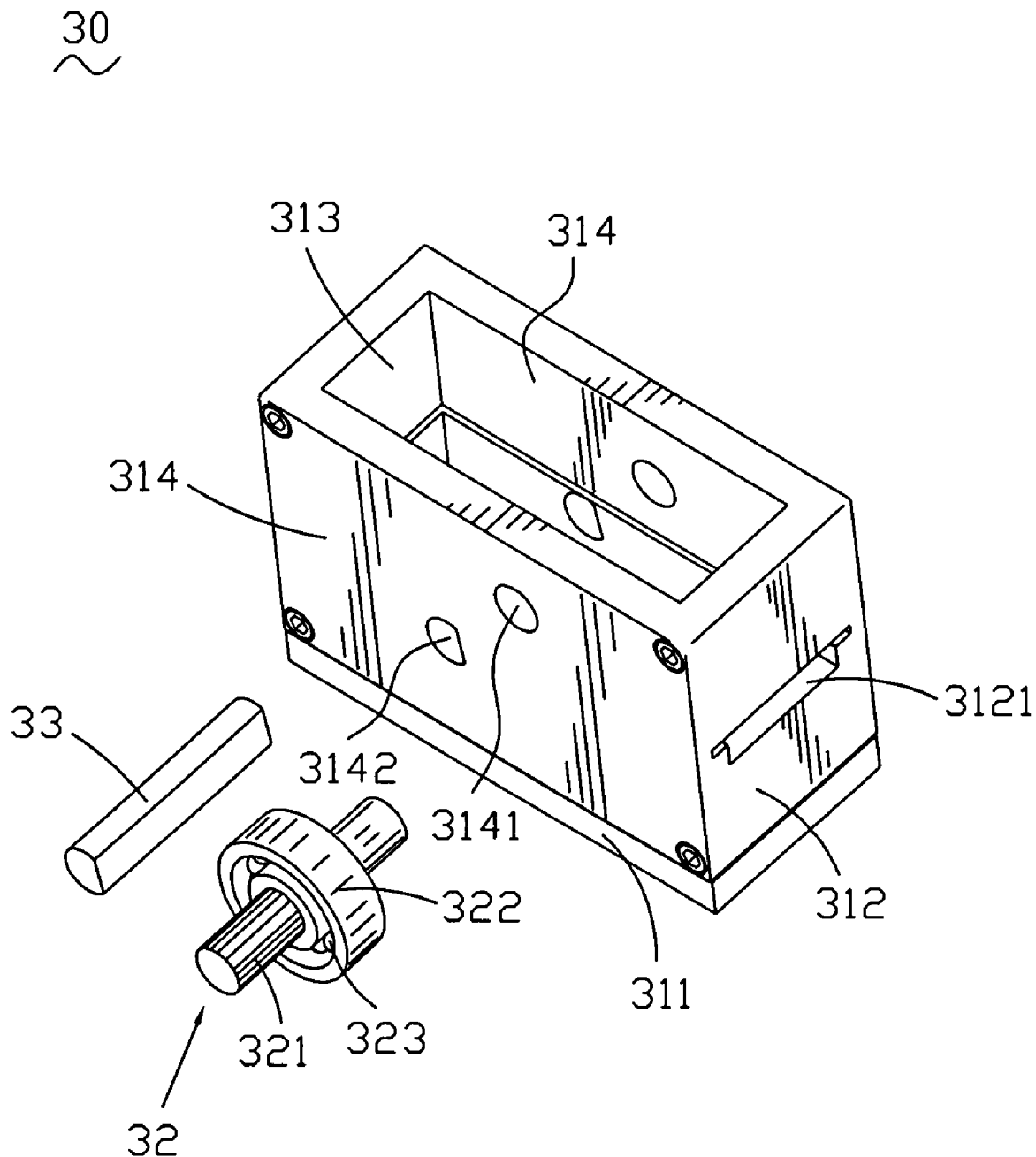
FIG. 3 is an exploded view of a separation apparatus of the cutting shield machine.
Figure 4:
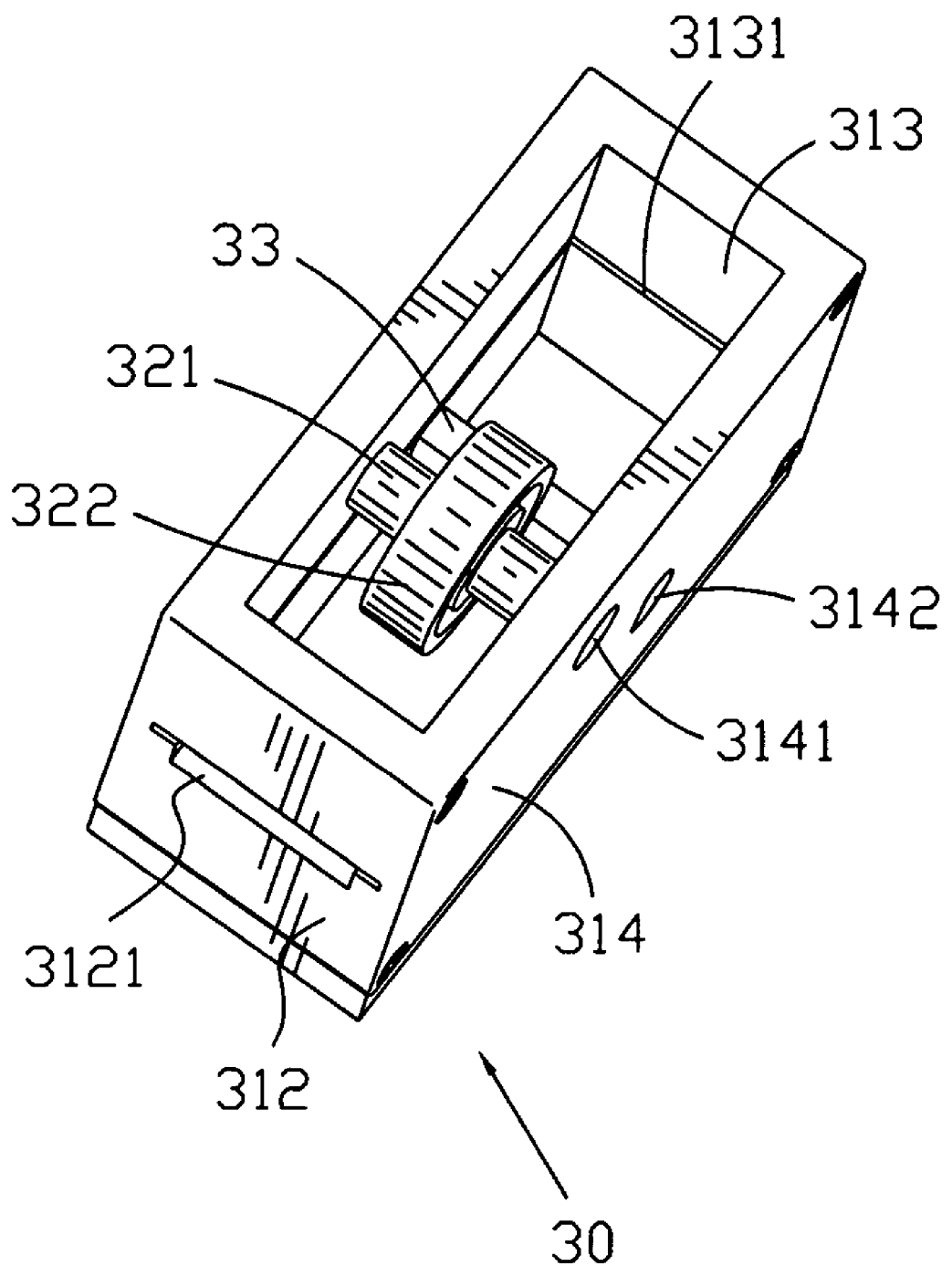
FIG. 4 is an assembled perspective view of the separation apparatus of the cutting shield machine.

Referring to FIGS. 1, 3 and 4, the separation apparatus 30 is arranged in the middle of the worktable 10 and attached to one side of the worktable 10. The separation apparatus 30 includes a prop stand 31 showing a cuboid box shape, a rotating portion 32 and a pole 33 fixed in the prop stand 31. The prop stand 31 has a foundation 311, the front side of the foundation 311 extends downward to form a front wall 312, the rear side of the foundation 311 extends downward to form a rear wall 313, the two sides of the foundation 311 extend downward to form two side walls 314. The foundation 311, the front wall 312, the rear wall 313 and the side walls 314 define an accepting space. An entrance 3121 is opened in the middle of the front wall 312. The entrance 3121 is at the same level with the shaft 213. An exit 3131 is opened in the rear wall 313 corresponding to the entrance 3121. Two shaft holes 3141 and two pole holes 3142 are opened in the two side walls 314 symmetrically.

The rotating portion 32 is accepted in the prop stand 31. The rotating portion 32 has a firming axle 321, a rolling wheel 322 encircling the middle of the firming axle 321, and a plurality of steel balls 323 arranged between the firming axle 321 and the rolling wheel 322. Two ends of the firming axle 321 are fixed in the shaft holes 3141. For the steel balls 323, the rolling wheel 322 can rotate freely around the firming axle 321.

The pole 33 has a bar shape. The pole 33 is arranged in the prop stand 31, two ends of the pole 33 are fixed in the pole holes 3142. One side of the pole 33 facing to the entrance 3121 is a plane, the other side of the pole 33 facing to the exit 3131 is a curved surface.

Figure 5:
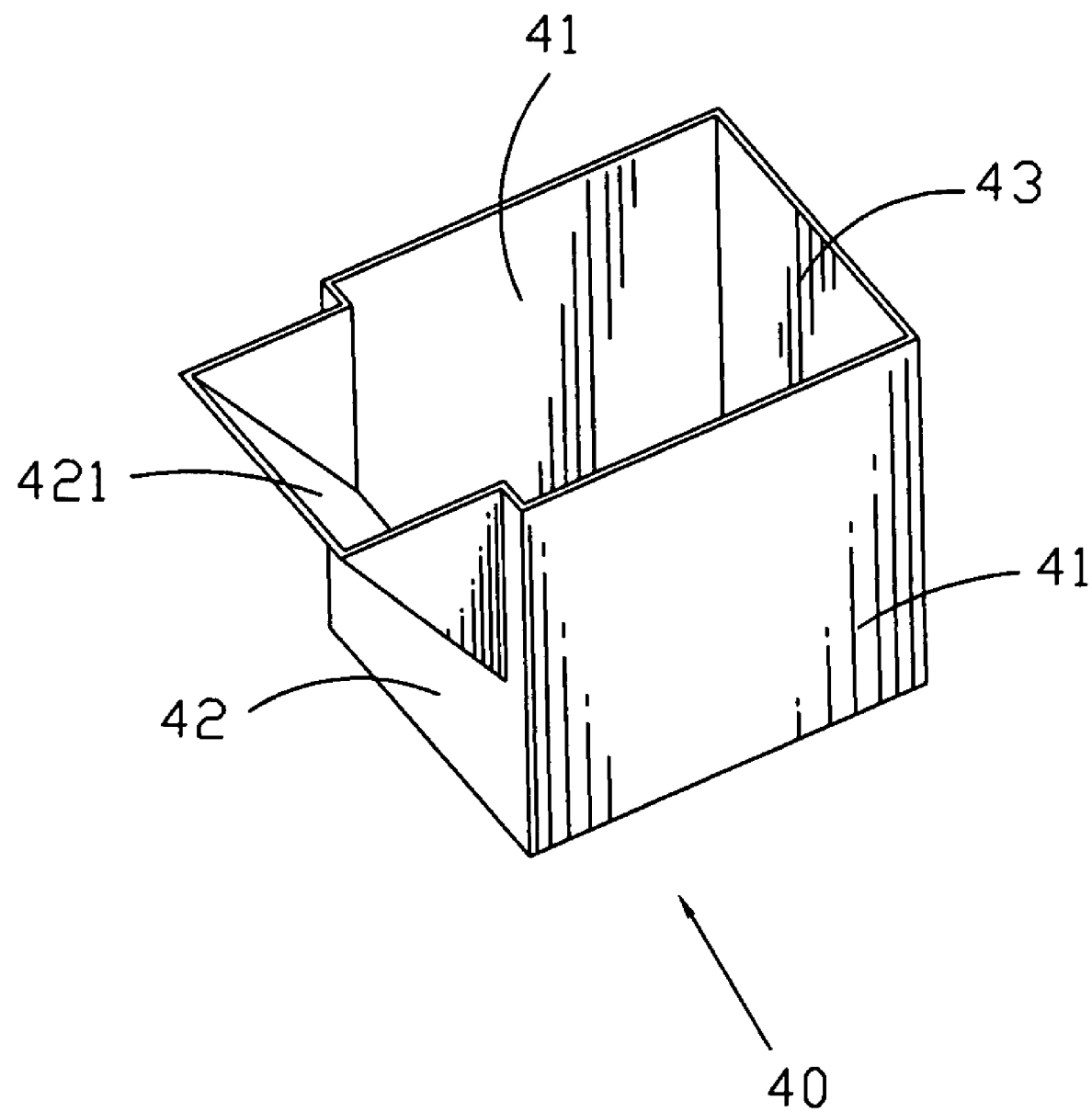
FIG. 5 is a perspective view of a receiving box of the cutting shield machine.

Referring to FIGS. 1 and 5, the receiving box 40 has a parallel box shape. The receiving box 40 includes two side walls 41, a front wall 42 and a rear wall 43. The front of the front wall 42 slants outward to form an accepting mouth 421.

The receiving box 40 is fixed below the separation apparatus 30. The accepted mouth 421 stretches out of the working board 11, the other part of the receiving box 40 is below the working board 11. Two sides of the bottom of the receiving box 40 are arranged on the crossing bars 13.

Figure 7:
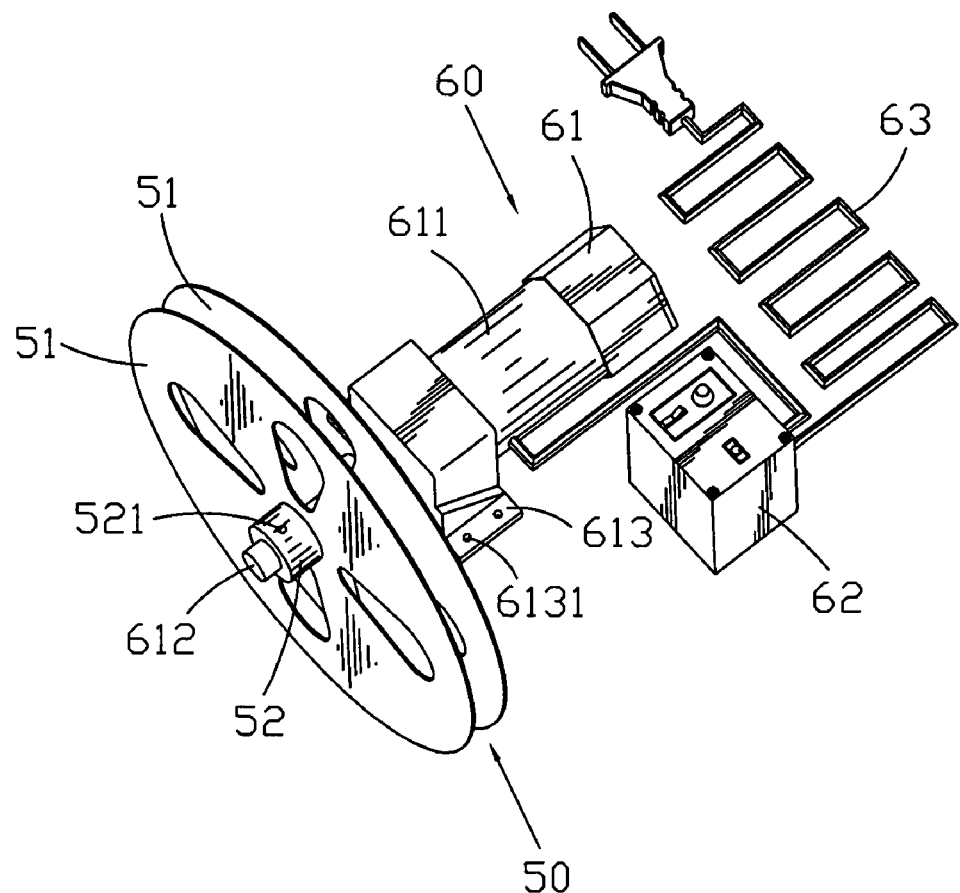
FIGS. 7-8 show perspective view of the driving apparatus and a crossing apparatus of the cutting shield machine, and a metal strip has a plurality rectangle frames connecting together.

Referring to FIGS. 1 and 7, the crossing apparatus 50 mainly includes two round boards 51. An axis sleeve 52 extends from the middle of the round boards 51. A screw hole 521 is opened in the axis sleeve 52. The round boards 51 are arranged in one side of the working board 11. The space between the round boards 51 is level with the exit 3131 of the separation apparatus 30 and the space between the inner firming block 214 and the outer firming block 215.

Figure 6:
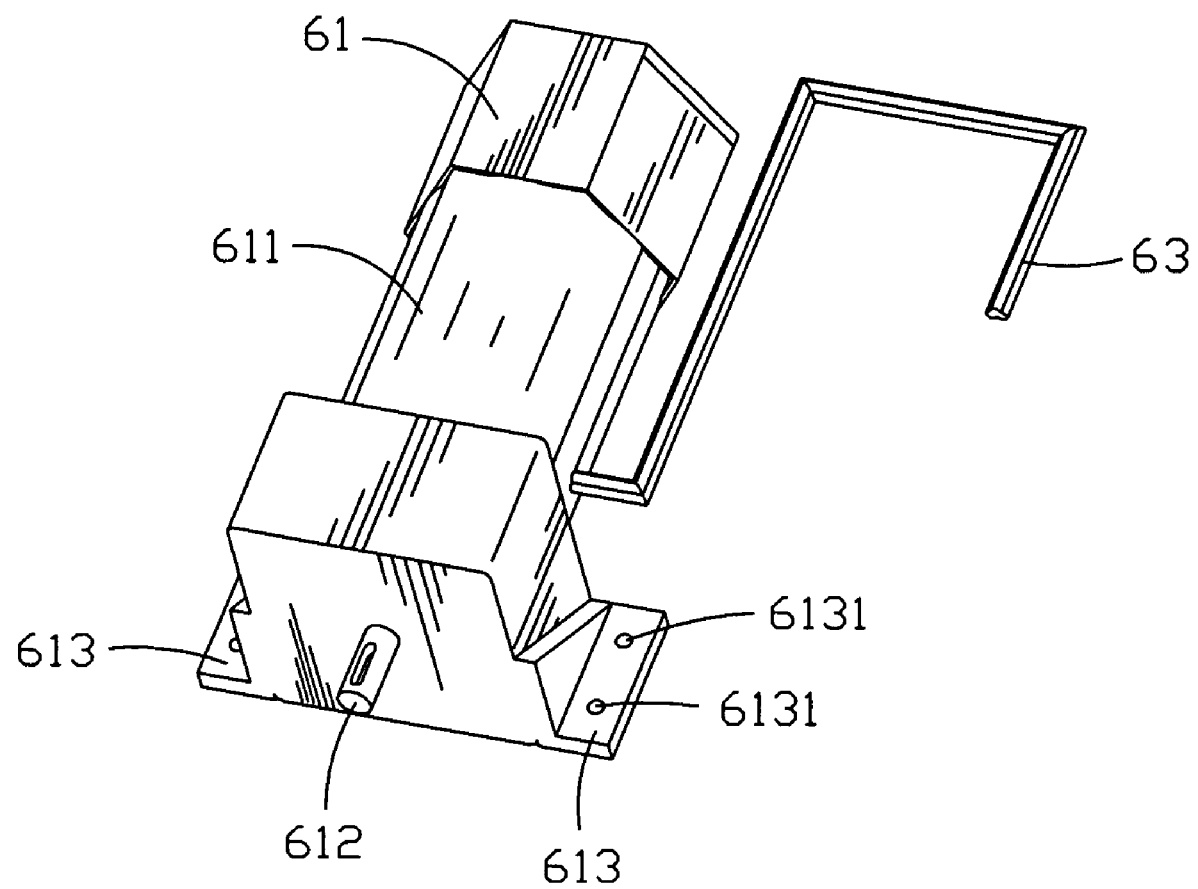
FIG. 6 is a perspective view of a driving apparatus of the cutting shield machine.

Please refer to FIGS. 1, 6 and 7, the driving apparatus 60 includes a motor 61, a control box 62 and a cable 63. The motor 61 has a main motor 611, a rotating axis 612 assembled in the main motor 611, and a base 613 covered on the rotating axis 612 and fixed with the main motor 611. A plurality of screw holes 6131 are opened on the base 613. Some screws pass through the screw holes 6131 and fix the motor 61 on the working board 11. The rotating axis 612 passes through the base 613 and inserts into the axis sleeve 52. A screw is inserted into the screw hole 521, therefore, the round boards 51 are fixed together with the rotating axis 612. The control box 62 is used for controlling the rotate speed of the driving apparatus 60 and switching the driving apparatus 60. The cable 63 connects the control box 62 with a power (not shown), so the motor 61 can drives the crossing apparatus 50 by the rotating axis 612.

Figure 8:
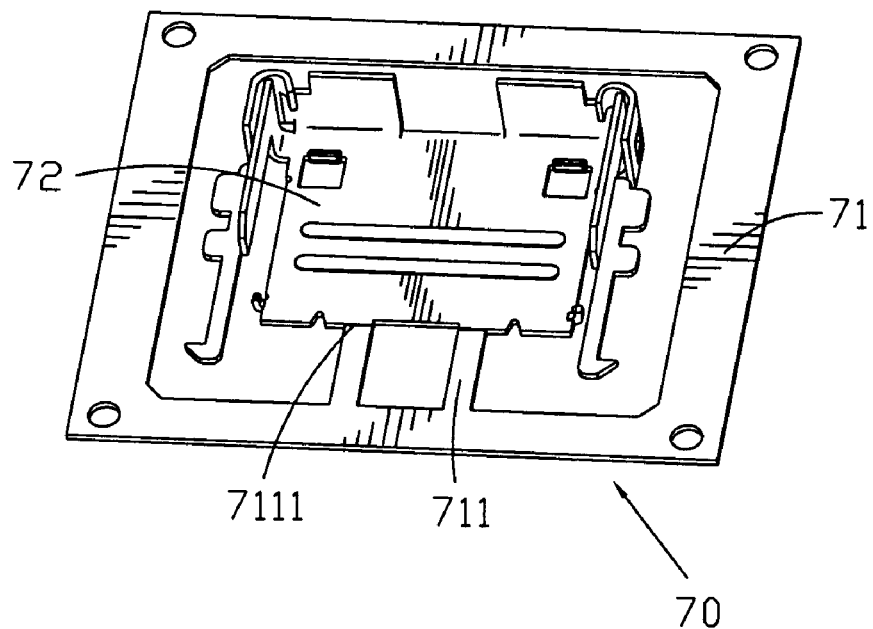

Referring to FIG. 8, a metal strip 70 has a plurality of rectangle frames 71 connecting together. In this embodiment, only one rectangle frame 71 is shown. An iron shell 72 is stamped in the rectangle frame 71. At least one connecting portion 711 is formed between the iron shell 72 and the rectangle frame 71. A breaking groove 7111 is opened between the iron shell 72 and the connecting portion 711. The metal strip 70 is settled on the shaft 213 and between the inner firming block 214 and the outer firming block 215, and the metal strip 70 passes through the entrance 3121 and the exit 3131, then the metal strip 70 is rolled around the axis sleeve 52 between the two round boards 51. The metal strip 70 between the entrance 3121 and the exit 3131 presses the top of the rolling wheel 322 and the bottom of the pole 33.

Referring to FIGS. 1 to 8, while the driving apparatus 60 driving, the motor 61 drives the crossing apparatus 50 by the rotating axis 612. The crossing apparatus 50 rolls up the metal strip 70 to drive the metal strip 70 to move forward ceaselessly. While the metal strip 70 moving forward, the bottom surface of the metal strip 70 contacts with the top of the rolling wheel 322 of the rotating portion 32, the top surface of the metal strip 70 contacts with the bottom of the pole 33, so the metal strip 70 leans between the rotating portion 32 and the pole 33, further more the pole 33 pushes the iron shell 72, therefore, the iron shell 72 is separated from the metal strip 70. The iron shell 72 separated from the metal strip 70 drops into the receiving box 40. The rectangle frames 71 moves forward and is output from the exit 3131, the rectangle frames 71 wind around the rotating axis 612 between the two round boards 51. While all iron shells 72 separates from the metal strip 70, the control box 62 cuts off the power, the cutting shield machine 100 stops.

While the cutting shield machine 100 separates the iron shells 72 from the metal strip 70, the following ways can be used: the top surface of the metal strip 70 contacts with the bottom of the rolling wheel 322 of the rotating portion 32, the bottom surface of the metal strip 70 contacts with the top of the pole 33, so the metal strip 70 leans between the rotating portion 32 and the pole 33, further more the pole 33 pushes the iron shell 72, the iron shell 72 is separated from the metal strip 70.

The rotating portion 32 may be only a columned bar, the two ends of the rotating portion 32 are fixed in the two side walls 314, the pole 33 and the rotating portion 32 contacts the metal strip 70 as the above-mentioned methods, then the iron shells 72 can be separated from the metal strip 70 too.

By the above description, the pole 33 and the rotating portion 32 contacts the metal strip 70 as the above-mentioned methods, then the iron shells 72 are separated from the metal strip 70 easily, so the invention is instead of the handwork, improves working efficiency greatly, and reduces the bad rate of the products and person's labor intensity, therefore the large-scale production is easily realized.

An embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A cutting shield machine for separating iron shells of connectors from a metal strip, comprising:
   a worktable;
   a separation apparatus, located in the worktable, the separation apparatus separating the iron shell from the metal strip;
   a carrying apparatus, located in the worktable, the carrying apparatus delivering the metal strip into the separation apparatus;
   a receiving box, located in the worktable, the receiving box receiving the iron shells separated from the metal strip by the separation apparatus;
   a crossing apparatus, located in the worktable, driving the metal strip forward and receiving the metal strip; and
   a driving apparatus located in the worktable and driving the crossing apparatus;
   wherein the separation apparatus has a prop stand located in the worktable, a rotating portion with a columned portion capable of rotation and a pole are fixed in the prop stand in sequence in the transmission direction of the metal strip.

2. The cutting shield machine as set forth in claim 1, wherein the prop stand has a foundation, the front side of the foundation extends downward to form a front wall, the rear side of the foundation extends downward to form a rear wall, the two sides of the foundation extend downward to form two side walls, an entrance is opened in the middle of the front wall, an exit is opened in the rear wall corresponding to the entrance, the rotating portion and the pole are fixed in the two side walls.

3. The cutting shield machine as set forth in claim 1, wherein the rotating portion includes a rolling wheel as the columned portion and a firming axle, the rolling wheel rotatably encircling the middle of the firming axle.

4. The cutting shield machine as set forth in claim 1, wherein the carrying apparatus has an accepting base showing a rectangle board, a firming apparatus projects upward from the working board, an axle hole is formed in the firming apparatus, a shaft is accepted in the axle hole of the firming apparatus, an inner firming block and an outer firming block are arranged separately in the one end of the shaft.

* * * * *